United States Patent [19]

Micelli et al.

[11] Patent Number: 5,044,921
[45] Date of Patent: Sep. 3, 1991

[54] RELEASABLE MOLD LOCKING APPARATUS

[76] Inventors: Joseph Micelli, 80-16 19th Ave., Jackson Heights, N.Y. 11370; John Micelli; Ned Micelli, both of 1118 Sunapee Rd., West Hempstead, N.Y. 11552

[21] Appl. No.: 475,362

[22] Filed: Feb. 5, 1990

[51] Int. Cl.$^5$ ............................................. B29C 33/20
[52] U.S. Cl. .................................. 425/451.9; 24/453; 249/118; 249/166; 249/167; 425/595
[58] Field of Search ................................. 249/165–167, 249/55, 118, 119; 425/190, 192 R, 541, 595, 451.9, DIG. 221; 24/297, 453, 563

[56] References Cited

U.S. PATENT DOCUMENTS

| | | | |
|---|---|---|---|
| 1,393,139 | 10/1921 | Kiesel, Jr. | 411/363 |
| 1,978,087 | 10/1934 | Johnson | 24/453 |
| 2,317,315 | 4/1943 | Wallace | 24/453 |
| 3,004,291 | 10/1961 | Schad | 425/451.9 |
| 3,426,399 | 2/1969 | Jones | 24/453 |
| 3,862,596 | 1/1975 | Putkowski | 425/451.9 |
| 4,248,583 | 2/1981 | Hedke et al. | 425/451.9 |
| 4,561,626 | 12/1985 | Black | 249/166 |
| 4,671,764 | 6/1987 | Hehl | 425/595 |

FOREIGN PATENT DOCUMENTS

| | | | |
|---|---|---|---|
| 2143132 | 3/1973 | Fed. Rep. of Germany | 425/451.9 |
| 51-52462 | 5/1976 | Japan | 425/451.9 |

Primary Examiner—James C. Housel
Attorney, Agent, or Firm—Kenyon & Kenyon

[57] ABSTRACT

A locking device mounted in the interior portions of a mold includes a first member having an aperture therein adapted to be coupled to a first section of the mold, a second member having an aperture therein adapted to be coupled to a second section of the mold, the first and second members being alignable with one another so that the apertures therein can be aligned with each other, a pin being provided axially in one of the first and second members, the pin being radially compressible and being axially movable in the aperture in one of the members and being receivable in the aperture in the second of the members such that when the pin is axially moved into the aperture in the second section, the pin first compresses radially and then expands so as to be securely locked to the second member thereby locking the two members and the two sections of the mold together. A spring is preferably used to apply a force to keep the two sections tightly held together when in the locked condition. Preferably, the two members are formed integrally with the mold sections. The mold locking device allows the mold to be easily locked and unlocked, and prevents material from seeping out from the joint between the two mold sections. The locking device is especially useful for casting two-sided solid or hollow chocolate items.

15 Claims, 3 Drawing Sheets

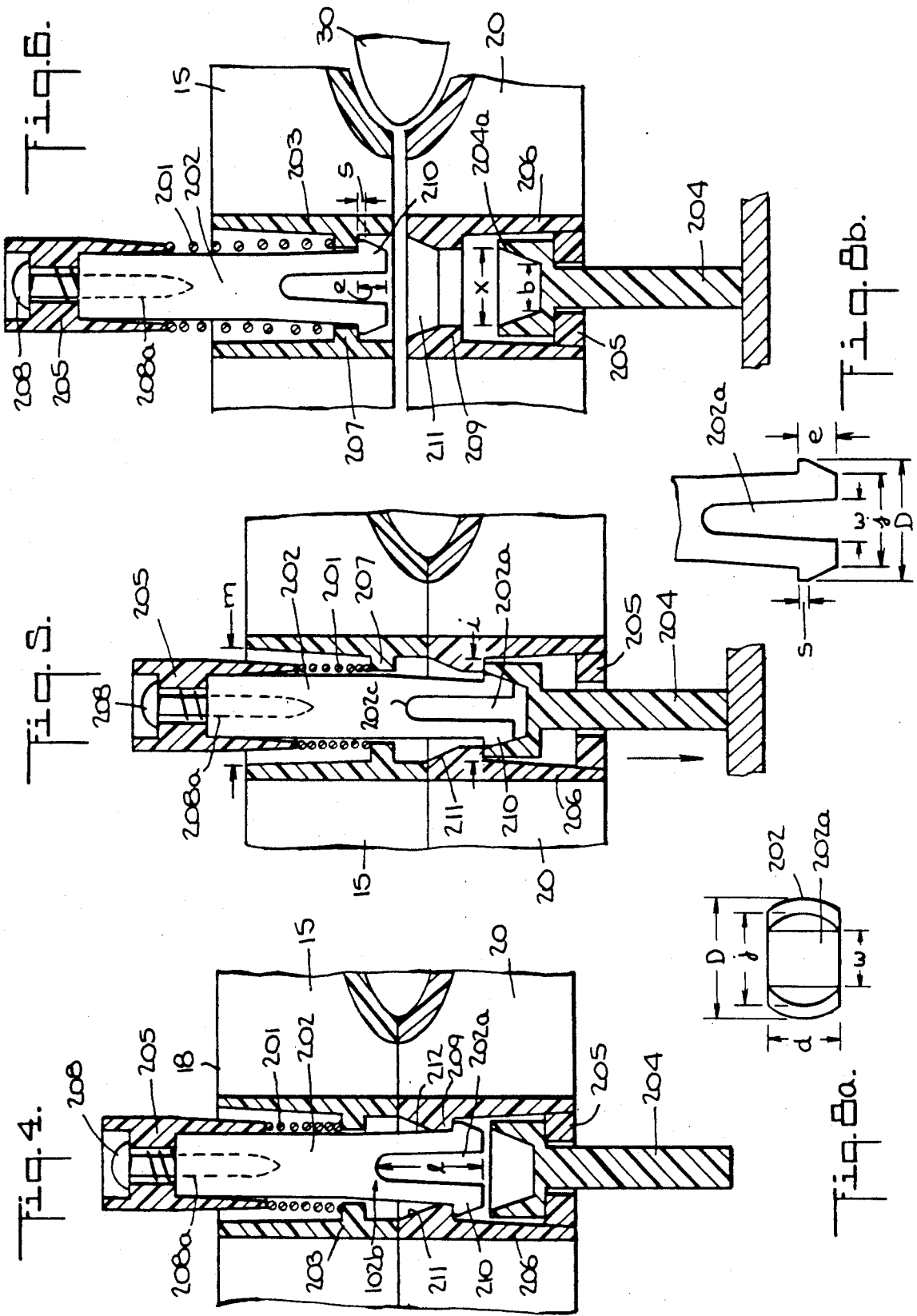

RELEASABLE MOLD LOCKING APPARATUS

BACKGROUND OF THE INVENTION

The present invention relates to molds and associated mold locking systems, and in particular, to two-piece molds for molding various materials which solidify upon cooling or otherwise, and even more particularly, to a mold and associated locking system for molding confectionary materials such as chocolate.

Generally, two-piece molds are employed in the forming of two-sided chocolate items. The molds are splittable into two sections once the poured chocolate has hardened. When making two-sided hollow or solid chocolate items, after the chocolate is poured into the mold, the mold must be violently vibrated to release the air bubbles from the still liquid chocolate. The molds are then placed into a cooling tunnel to solidify the chocolate and subsequently opened to remove the cast figures.

With conventional molds, especially during the vibration process, chocolate tends to seep out of the mold at the region where the two sections of the mold join. As the molds are reused, this chocolate builds up externally and acts as an insulator, interfering with the cooling process. Additionally, if not cleaned, the chocolate remaining in the joint regions of the mold intereferes with subsequent locking and pouring operations. Further, the figures tend to attach to the accumulated chocolate, forcing manufacturers to resort to mechanical means such as banging to free the figures from the mold. This means the molds must be washed frequently. So severe is this problem, many manufacturers refrain from making products requiring two-sided chocolate molding.

Previous devices to lock the mold halves together suffer from serious drawbacks. Locks placed around the outside of the mold apply pressure to the perimeter of the mold only. This causes the outside to be squeezed together and the inside to bulge. This tends to allow the chocolate to leak around the joint regions between the two mold halves. Further, the locks can interfere with the machinery, such as conveyors, etc., that must handle the mold because they extend past the mold boundaries.

A more recent technique that has been used is the placement of magnets around the inside of the mold to hold the two halves together; however, magnets are very expensive and further, the pull they exert weakens with distance. Additionally, chocolate can accumulate on the magnets themselves. This results in a severe loss of locking power. Accordingly, the problem with magnets is that they do not provide a positive mechanical lock.

Many present molds, and all of those with magnets, use a hinge on one side to simplify the locking process; however, during the molding process, the stress to which the molds are subjected causes the hinges eventually to misalign. The major problem is the banging sometimes required to release the figures from the mold. The misalignment of the hinge results in misalignment of the figures which must then be rejected for quality reasons. What is needed is a locking system whose locking force increases as the vibration process attempts to force it open, that is easy to lock and unlock, that will not misalign with time or abuse, that allows easy and convenient removal of the items molded and that will not allow chocolate to escape during the vibration process.

SUMMARY OF THE INVENTION

Accordingly, it is an object of the present invention to provide a new mold locking device for locking the two sections of a mold together.

It is yet still a further object to provide such a mold locking device that ensures that all areas of the mold are adequately locked together, i.e., both perimeter and interior portions of the mold, to prevent leakage.

It is still another object of the present invention to provide a mold locking device which provides increased force locking the mold together as vibrational forces that tend to cause the mold to separate increase.

It is yet still another object of the invention to provide an easily usable, easily releasable mold locking system, and particularly one which allows quick and simple removal of the molded items from the mold.

It is yet still a further object to provide such a mold locking device which can be used both in industry and for general consumer use.

It is yet still another object to provide such a mold locking device that can be used in a wide variety of molds for casting a wide variety of materials, including, for instance, plastics, wax, soap, low temperature metals and other pourable items, in addition to confectionary items such as chocolate. With suitable change in the materials from which the mold is made to accommodate refractory materials, the mold and locking system of the invention could even be adapted to high temperature metal casting.

It is yet still a further object of the present invention to provide a splittable mold having locking devices which positively prevent seepage of the poured materials from the joint between the mold halves.

The above and other objects of the invention are achieved by an apparatus for releasably holding two objects together comprising a first member having an aperture therein and adapted to be coupled to a first of the objects, a second member having an aperture therein and adapted to be coupled to a second of the objects, the first and second members being alignable with one another so that the apertures therein can be aligned with each other, a pin being provided axially in a first of the members, a force applying means being provided coupled between the pin and the first member, the pin being radially compressible and being axially movable in the aperture the first of the members and being receivable in the aperture in the second of the members such that when the pin is moved into the aperture in the second member, the pin first compresses radially and then expands so as to be securely locked to the second member with the force supplying means providing a force holding the pin against the second member, thereby locking the first and second members together.

The invention further comprises a mold having a first section and a second section adapted to be joined together along a common plane, the first section having an aperture therein, the second section having an aperture therein, the first and second sections being alignable with one another so that the apertures therein can be aligned with each other, a pin being provided in the aperture in a first of the sections, the pin being radially compressible and being axially movable in the aperture in the first section and being receivable in the aperture in the second section such that when the pin is moved into the aperture in the second section, the pin first compresses radially and then expands so as to be securely locked to the second section, thereby locking the first and second sections together.

In general, the releasable locking apparatus of the present invention is a lock that can be used to hold two things solidly together. It can be locked simply by holding together the two objects to be locked and by pressing the pin of the lock into the aperture in the other member and it can be unlocked simply by pressing a disengage piece into the lock, or by providing a disengage piece as part of the lock. Further, the lock will tolerate large numbers of lock/unlock cycles without wearing out. A further advantage of the invention is that multiple locks holding the same two pieces together can all be locked or unlocked in a single action.

In a preferred embodiment, the lock locks together two turret members with the pin. By attaching one turret member to each of the two pieces to be locked together, any two pieces can be locked. When the lock is unlocked, the pin sits in one of the turret members. It is pressed through the second turret member to lock the lock. The pin compresses radially as it enters the second turret member and then snaps back after it has entered the second turret member, firmly held in place by an annular ridge on the interior of the second turret member. A spring can be used to pull back on the pin, thereby holding the turret members together securely. To disengage the pin, and thus unlock the lock, one merely recompresses it. A disengage device shaped to compress the pin releases the pin when pressed into the second turret member. Then the same spring will pull the pin back against the first turret member, releasing the lock.

This type of lock is particularly well suited to the molding industry, and in particular, the confection and chocolate molding industry. Accordingly, it is an object of the preferred embodiment of the invention to hold a mold securely closed during the vibration process encountered in the chocolate molding process. A further object of the invention is to speed the molding process by allowing the molds to be locked and unlocked quickly.

In a preferred embodiment, the turret members are integral parts of the mold, and a plurality of such turret members are provided spaced throughout the mold to lock the two mold sections securely together.

A method releasably locking two mold sections together is also within the scope of the invention.

Still other objects and advantages of the invention will in part be obvious and in part be apparent from the detailed specification that follows.

BRIEF DESCRIPTION OF THE DRAWINGS

The invention will now be described in greater detail with reference to the accompanying drawings, in which:

FIG. 3 shows a portion of the mold embodying the locking devices of the present invention after the locking devices have been released, allowing removal of the molded items;

FIG. 4 shows the locking device in the locked positon holding the two mold sections together;

FIG. 5 shows the locking device during the release process just prior to release of the locking device;

FIG. 6 shows the locking device after release;

DETAILED DESCRIPTION

Figure 1:
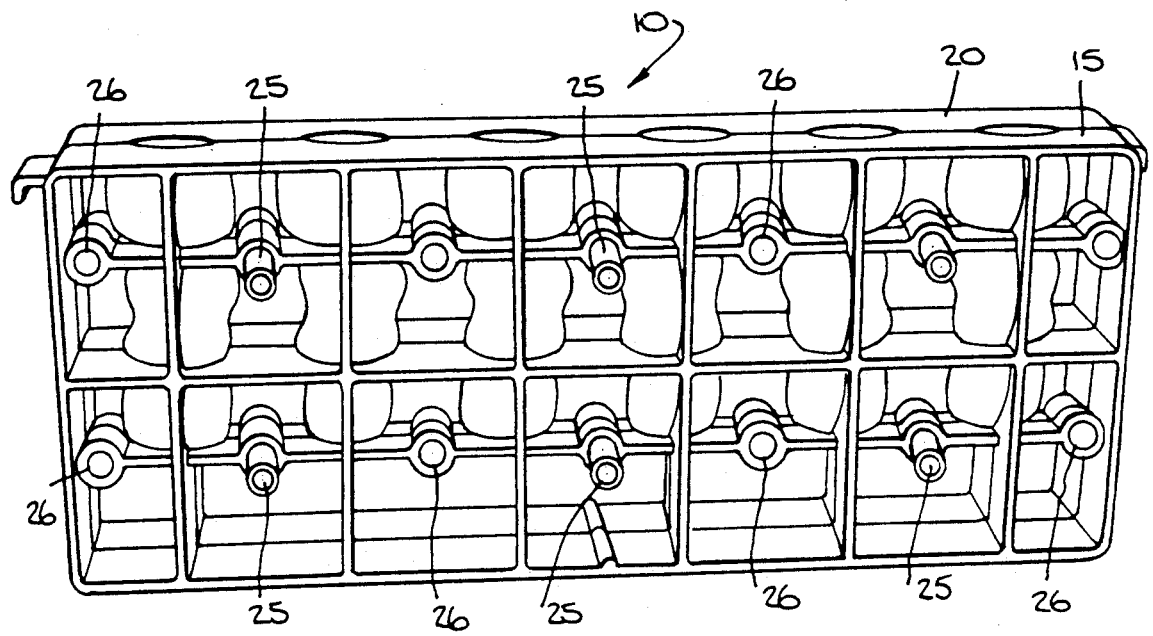
FIG. 1 is a perspective view of an assembled mold embodying a plurality of the locking devices of the present invention.

With reference now to the drawings, a mold for molding a plurality of items, in the illustrated embodiment, six items, and embodying the locking device of the present invention is shown in FIG. 1. The mold, generally indicated by reference numeral 10, comprises two sections 15 and 20 releasably held together by a plurality of locking devices 25 secured in apertures comprising adjoining, alignable turret members in the two mold sections. Additional aligned apertures 26 may be provided in the mold sections, as necessary to lock the two mold sections together adequately. In the embodiment shown, these apertures 26 are unused, but may also be provided with locking devices 25 if greater locking force is required. In the illustrated embodiment, only six locking devices are provided, but as many locking devices as necessary can be used. In the mold illustrated, as many as fourteen locking devices can be accommodated, but the number of locks can vary depending on the mold requirements.

With reference to all the figures, and in particular, FIGS. 4 to 6, a preferred embodiment of the invention comprises a six-part lock comprising a four part insertable locking assembly and two part receptacle for the locking assembly, and a one part disengage device. A number of these locking assemblies, if placed into corresponding receptacles of two aligned mold sections serve to lock the mold sections securely and easily. As described, the molds may be made to accommodate a plurality of locking assemblies if needed, with the locking assemblies simply pressed into apertures in the mold if the molds show any signs of leakage.

FIG. 4 shows all six parts of the lock comprising the four-part locking assembly and the two part receptacle in the locked position as well as the disengage device. The function of each part will be clear from the following description, with reference particularly to FIGS. 4 to 6.

FIG. 6 shows the pieces assembled and unlocked. The locking assembly comprises a split lock pin 202 disposed in a receptacle comprising a first turret member 203. A spring 201 biases the lock pin 202 so that it is held flush with surface 16 or slightly within the mold section 15. The turret member 203 may be made integral with the mold section 15. Spring 201 is held in position between an annular ridge 207 in the interior of the first turret member 203 and a lock spring head 205 which may be secured to the pin 202 by a suitable fastening means, such as a screw or pin 208, which may be secured to the pin 202 as, for example, by suitable threads or a press fit. Other fastening means can be used. The four part locking assembly comprising parts 201, 202, 205 and 208 may be inserted into turret member 203 after assembly thereof simply by pressing pin 202 into the turret member 203. Annular ridge 207 will compress the split lock pin 202, to be described in greater detail below, until tapered head 210 of the pin is past the ridge 207, at which point the pin will expand again, holding the pin in place in the turret member 203 against the force of spring 201.

The other mold section 20 may comprise a second turret member 206 which may also be integrally formed in the second mold section. The second turret member 206 includes an interior annular ridge 209 which is adapted to receive the tapered split locking head 210 of pin 202 and is suitably provided with a tapered opening 211. A disengage device 204 optionally may be provided in the locking device to release the lock once it is placed in its locked position, as will be described.

FIG. 4 shows the locking device of the present invention in its locked position. To place the locking device of the present invention in its locked position, the mold preferably is held such that section 15 of the mold is adjacent a flat surface. The lock spring head 205 which extends past the surface 18 of the mold section 15 is then pressed against the flat surface. As several of the locking devices may be provided on the mold, all of the lock spring heads 205 may be pressed against the flat surface, thereby forcing the compressible split lock pin head 210 into the second turret member 206, such that the tapered head 210 of the lock pin compresses radially as it engages the tapered surface of aperture 211 in the second turret member 206. Once the tapered head portion 210 of the split lock pin is completely past the annular ridge 209 of the second turret member 206, it is securely locked into position, thus locking the two halves 15 and 20 of the mold together. Any attempts to separate the two mold sections 15 and 20 will not meet with success due to the pressure of the spring 201 holding the two mold halves securely together.

To release the lock, one simply presses against the disengage member 204 while holding the mold against movement, such as is shown in FIG. 5, by placing the mold section 20 against a flat surface, pressing the mold downwardly, thus forcing the disengage member 204 against split lock pin 202. This compresses the head 210 of the split lock pin and causes the lock spring 201 to withdraw the split lock pin 202 past annular ridge 209 into the turret member 203. This causes the lock to unlock as shown in FIG. 6.

In FIGS. 4 to 5, disengage members 204 are made a part of the locking assembly, held against removal by insert 205. This need not be the case, however, as the disengage members may be physically separate from the locking assemblies and only inserted when it is desired to unlock the lock.

Figure 7:
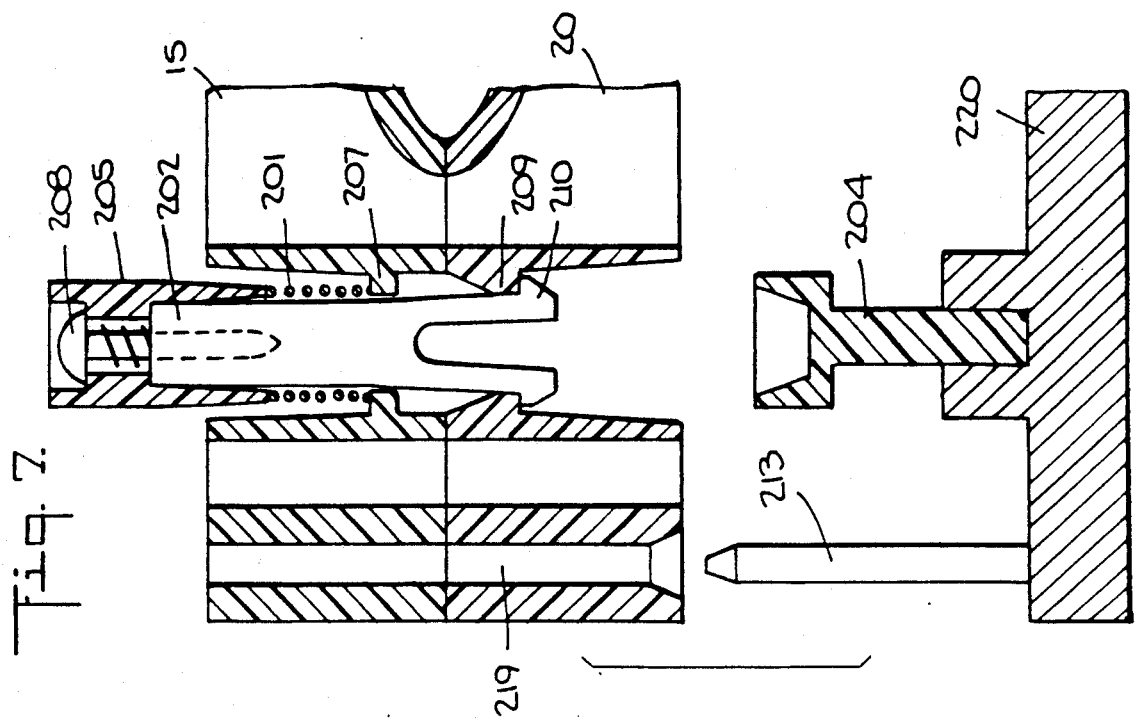
FIG. 7 shows an alternative embodiment of the locking device for use with an unlocking plate for releasing one or more of the locking devices simultaneously.

Furthermore, as shown in FIG. 7, multiple disengage members 204 spaced to match the locks on the mold can be mounted on a plate 220, allowing the user to release all the locks by placing the mold set onto the plate and pressing down. An alignment pin 213 in plate 220 and corresponding aperture 219 in mold section 20 may be provided to facilitate alignment. To lock the mold together, the user can simply flip over the mold so that lock heads 205 face downwardly or against a suitable flat surface, and press against the flat surface; this locks all the locks on the mold in one single action.

Figure 2:
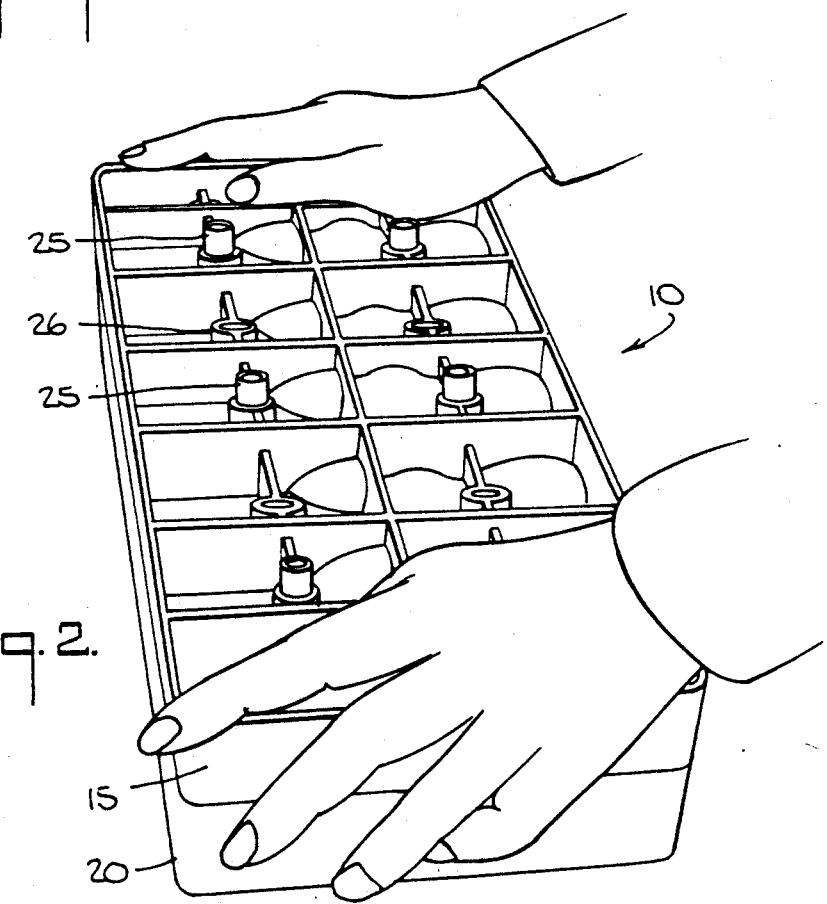
FIG. 2 shows how the locking devices of the present invention may be released manually by a user by pressing the mold against a flat surface.

Returning to FIG. 1, this figure shows the mold embodying the locking device of the present invention containing six locking devices. This mold can be locked by simply pressing it against a hard, flat surface. This presses each of the split lock pins 202 through the corresponding turret member 206. To unlock the mold, one simply flips it over and, in the embodiment having disengage members 204 as part of the locking devices, places the ends of disengage members 204 against the flat surface, pressing downwardly on the mold, as shown in FIG. 2. This releases all the locking devices in one action, allowing removal of the molded items 30, as shown in FIG. 3. If disengage members 204 are not provided as part of the locking devices, but instead are mounted on a plate, as shown in FIG. 7, one aligns the mold over the plate containing the disengage members 204 aligned with each lock. Pressing the mold causes each lock to unlock as the disengage member compresses the split lock pin.

With reference particularly to FIGS. 4 to 6, further details of the locking device are as follows:

The hole 208a in the split lock pin preferably is the size of the root diameter of the fastening means 208 used, e.g., a sheet metal or wood screw. This allows the attachment of the lock spring head 205 without the need for tapping or prior threading.

Figure 8:
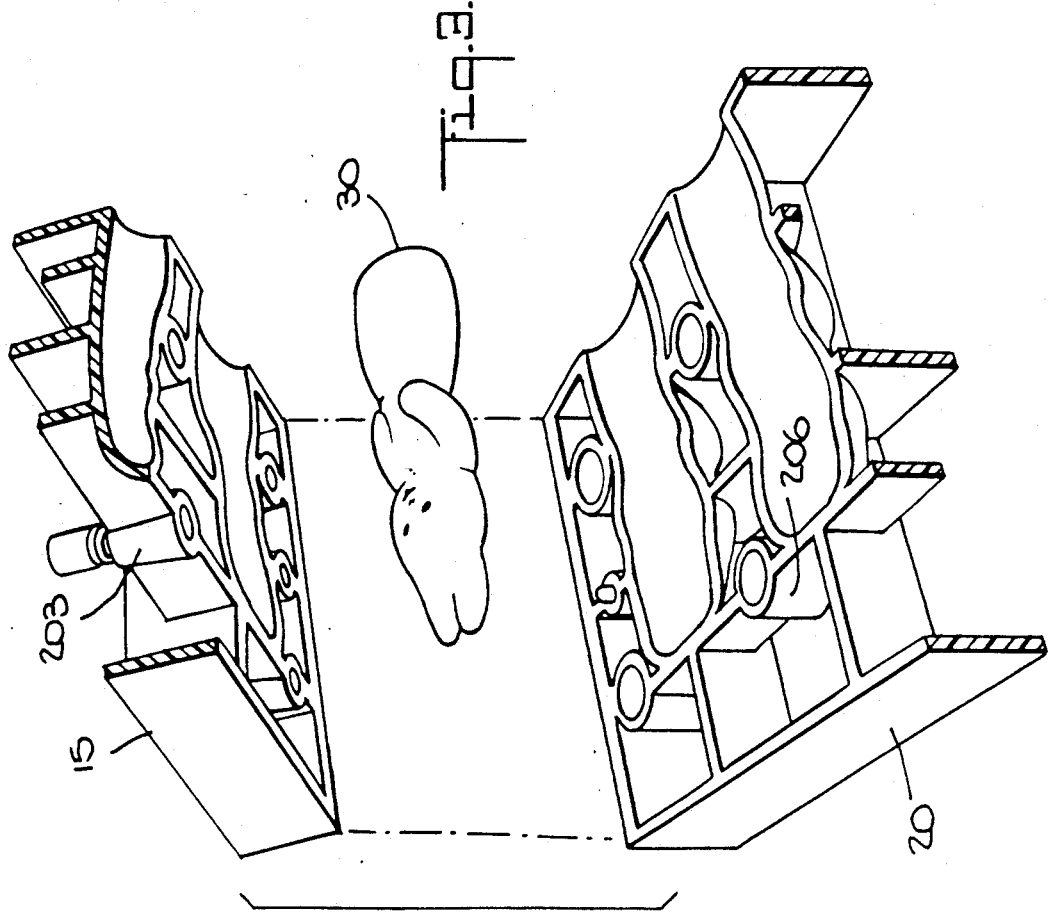
FIGS. 8a and 8b show, respectively, an elevational view and side view of one end of the split lock pin used in the locking device of the present invention.

FIGS. 8a and 8b show the end 210 of the split lock pin 202 in greater detail.

The cross dimension d of the outside arc preferably should not exceed approximately 65% of the outside dimension D. This dimension exponentially reduces the force required to engage the lock and also acts as a relief to ensure full spread of the split lock pin. In a preferred embodiment, the dimension d is 0.330" and D=0.515". Side 212 of the pin 202 in its relaxed state preferably has a three degree taper beginning at approximately the interior terminal end 202b of the slot 202a and continuing up to the head 210 of the pin 202. The taper acts as a preload for the snap-fit action of the pin. This is a desirable feature because it adds to the positive nature of the lock-hold while the pin is snapped into the turret member 206. The slot length 1 (FIG. 4), in a preferred embodiment, is 0.600" and the width w is 0.164". These two dimensions were calculated through testing. Four factors contributed to the selection of these dimensions:

(a) The amount the pin is required to squeeze to enter the turret member 206.

(b) The amount of force available to engage or disengage the pin 202.

(c) The amount of holding power required.

(d) The degree to which the material of the pin 202 can bend and still retain a memory of its initial state.

In a preferred embodiment of the invention used for chocolate molding, the lock pin 202, lock head 205 and disengage member 204 are made of DuPont Delrin Grade 100 plastic. Other materials can also be used depending on the material to be poured. The material requires characteristics of toughness, wear resistance and memory. The mold sections 15 and 20 can be made of any suitable material compatible with the material being poured, for example, sections 15 and 20 may be made of clear plastic such as Lexan or a metal.

A deeper slot in pin 202 means less force is required to engage or disengage the lock pin and thus means less holding power. A shorter slot means more force is required to engage or disengage the lock pin and thus means more holding power. A radius 202c is preferably provided at the bottom of the slot to instill strength and memory. Illustratively, the radius is 1/16".

Dimension D preferably is approximately 1/5% above the inside dimension i (FIG. 5) of the turret member 206 and ensures that when in the locked position the pin 202 seeks the center of the turret member. In the preferred embodiment, dimension i is 0.500".

The taper of head 210 of lock pin 202 is preferably 22° and was determined as a result of multiple tests to achieve the smoothest operation. This taper preferably is matched in the turret member 206 by the taper of the opening 211. The dimension e of head 210 of pin 202 ensures that when in the unlocked position (FIG. 6) the pin 202 does not protrude past the surface 16 of the mold. A straight dimension s with no taper is incorporated to increase greatly the long term efficiency of the device. The reason is that should wear occur on the tapered surface 210 the dimension D would not be diminished. In a preferred embodiment, dimension e is approximately 0.160" and dimension s is 0.030".

The inside dimension of spring 201 preferably equals the outside nontapered dimension of split lock pin 202 plus at least 0.010 for clearance. The outside dimension of the spring preferably equals the inside dimension m of turret member 203 minus at least 0.010" for clearance. The spring 201 acts as a sleeve guide for pin 202. The difference in height between the compressed and relaxed states of the spring when mounted in the turret member 203 should be greater than the engaging stroke of the pin 202. Generally, the engaging stroke +10% equals the difference in height between spring states.

Preferably, the taper 204a used for disengaging member 204 is 20 degrees. The dimension x is just slightly larger than the smallest distance j (FIGS. 8a and 8b) of the taper of the split lock pin 202. The disengage pin 204 immediately begins to squeeze the split lock pin 202 as it is pressed onto it. The disengage pin should not bottom out before the split lock pin 202 is released, as shown in FIG. 5.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A mold comprising:
   a first section and a second section adapted to be joined together along a common plane;
   said first section having an aperture therein;
   said second section having an aperture therein;
   said first and second sections being alignable with one another so that the apertures therein can be aligned with each other;
   a pin being provided in the aperture in the first section, said pin being radially compressible and being axially movable in the aperture in said first section and being receivable in the aperture in the second section such that when said pin is moved into the aperture in said second section, said pin first compresses radially and then expands so as to be securely locked to said second section, thereby locking the first and second sections together, said pin comprising a shaft having a forked end, said forked end having a head adapted to be received in a surface of the aperture in said second section, at least one of said head of said forked end and said surface of the aperture comprising a tapered surface whereby said forked end is compressed by said tapered surface as the pin is moved axially in said aperture in the second section, said aperture of said second section having a radially enlarged space therein so that once the pin reaches a point of maximum compression, said pin expands to be securely received in said aperture in said second section.

2. The mold recited in claim 1, further comprising a spring coupled between said pin and said first section for providing a force holding said first and second sections together when said pin is securely received in said second section.

3. The mold recited in claim 2, wherein said spring is received in said aperture in said first section between said pin and said first section.

4. The mold recited in claim 3, further comprising an annular ridge in the aperture in said first section for retaining said spring.

5. The mold recited in claim 4, further comprising a cap attached to said pin for retaining said spring between said cap and said annular ridge.

6. The mold recited in claim 1, wherein both said head of said forked end and said surface of the aperture in said second section comprises a tapered surface.

7. The mold recited in claim 6, further comprising a disengaging pin means insertable in the aperture in the second section for compressing said pin when said two sections are securely locked together to unlock said two sections, and further wherein said disengaging pin means has a tapered surface for engaging the tapered head of the forked end of the pin for unlocking the pin from the second section.

8. The mold recited in claim 1, further comprising a disengaging pin means insertable in the aperture in the second section for compressing said pin when said two sections are securely locked together to unlock said two sections.

9. The mold recited in claim 8, wherein said disengaging pin means is retained in the aperture in said second section.

10. The mold recited in claim 8, further comprising a plate on which said disengaging pin means is disposed, said aperture in said second section being alignable with said disengaging pin means and receiving said disengaging pin means so as to compress said pin to unlock said first and second sections when said disengaging pin means is inserted into said aperture in said second section.

11. The mold recited in claim 1, wherein said pin is compressibly insertable into the aperture in the first section.

12. The mold recited in claim 1, wherein said mold sections include a plurality of aligned apertures for receiving respective pins for securing said sections of the mold together in a plurality of locations.

13. The mold recited in claim 12, wherein said locations are distributed throughout said mold at interior portions of the mold.

14. The mold recited in claim 12, wherein said mold sections comprise a plastic material adapted for molding items made of a material selected from one of chocolate, soap or wax.

15. The mold recited in claim 12, wherein said plurality of pins in aligned ones of said apertures in said first and second sections are lockable in a single motion and unlockable in a single motion by applying force to said pins simultaneously.

* * * * *